US008656408B2

(12) United States Patent
Elshishiny et al.

(10) Patent No.: US 8,656,408 B2
(45) Date of Patent: Feb. 18, 2014

(54) SCHEDULING THREADS IN A PROCESSOR BASED ON INSTRUCTION TYPE POWER CONSUMPTION

(75) Inventors: Hisham E. Elshishiny, Cairo (EG); Ahmed T. Sayed Gamal El Din, Giza (EG)

(73) Assignee: International Business Machines Corporations, Armonk, NY (US)

( * ) Notice: Subject to any disclaimer, the term of this patent is extended or adjusted under 35 U.S.C. 154(b) by 190 days.

(21) Appl. No.: 13/247,887

(22) Filed: Sep. 28, 2011
(Under 37 CFR 1.47)

(65) Prior Publication Data
US 2012/0084790 A1 Apr. 5, 2012

(30) Foreign Application Priority Data

Sep. 30, 2010 (EP) .................................... 10183345

(51) Int. Cl.
 *G06F 9/46* (2006.01)
 *G06F 1/00* (2006.01)
(52) U.S. Cl.
 USPC ........... 718/108; 718/101; 718/102; 718/106; 718/107; 713/300
(58) Field of Classification Search
 None
 See application file for complete search history.

(56) References Cited

U.S. PATENT DOCUMENTS

| 6,658,447 | B2 | 12/2003 | Cota-Robles |
| 6,948,082 | B2 | 9/2005 | Gschwind et al. |
| 7,197,652 | B2 | 3/2007 | Keller, Jr. et al. |
| 7,437,581 | B2 | 10/2008 | Grochowski et al. |
| 7,596,430 | B2 | 9/2009 | Aguilar, Jr. et al. |
| 7,653,906 | B2 | 1/2010 | Chen et al. |
| 8,001,549 | B2 | 8/2011 | Henmi |
| 8,095,806 | B2 * | 1/2012 | Suh et al. ...................... 713/300 |
| 8,195,962 | B2 | 6/2012 | Naffziger et al. |

(Continued)

FOREIGN PATENT DOCUMENTS

WO 2007128168 11/2007

OTHER PUBLICATIONS

Bautista, D., J. Sahuquillo, H. Hassan, S. Petit, and J. Duato, "A Simple Power-Aware Scheduling for Multicore Systems when Running Real-Time Applications", © 2008 IEEE, Total 7 pp.

(Continued)

*Primary Examiner* — Emerson Puente
*Assistant Examiner* — Adam Lee
(74) *Attorney, Agent, or Firm* — Janaki K. Davda; Konrad Raynes Davda & Victor LLP

(57) ABSTRACT

Guiding OS thread scheduling in multi-core and/or multi-threaded microprocessors by: determining, for each thread among the active threads, the power consumed by each instruction type associated with an instruction executed by the thread during the last context switch interval; determining for each thread among the active threads, the power consumption expected for each instruction type associated with an instruction scheduled by said thread during the next context switch interval; generating at least one combination of N threads among the active threads (M), and for each generated combination determining if the combination of N threads satisfies a main condition related to the power consumption per instruction type expected for each thread of the thread combination during the next context switch interval and to the thread power consumption per instruction type determined for each thread of the thread combination during the last context switch interval; and selecting a combination of N threads.

20 Claims, 4 Drawing Sheets

(56) References Cited

U.S. PATENT DOCUMENTS

| | | | |
|---|---|---|---|
| 2003/0115239 A1* | 6/2003 | Togawa | 709/102 |
| 2003/0126476 A1 | 7/2003 | Greene | |
| 2003/0131269 A1* | 7/2003 | Mizyuabu et al. | 713/320 |
| 2004/0128663 A1* | 7/2004 | Rotem | 717/161 |
| 2004/0158831 A1 | 8/2004 | Amano et al. | |
| 2005/0120254 A1* | 6/2005 | Suzuoki et al. | 713/320 |
| 2005/0149937 A1* | 7/2005 | Pilkington | 718/102 |
| 2005/0278520 A1 | 12/2005 | Hirai et al. | |
| 2006/0053323 A1* | 3/2006 | Kissell | 713/300 |
| 2006/0107262 A1 | 5/2006 | Bodas et al. | |
| 2006/0236136 A1 | 10/2006 | Jones | |
| 2007/0106990 A1 | 5/2007 | Kissell | |
| 2008/0222434 A1 | 9/2008 | Shimizu et al. | |
| 2009/0064164 A1 | 3/2009 | Bose et al. | |
| 2009/0070607 A1* | 3/2009 | Safford et al. | 713/320 |
| 2009/0217277 A1* | 8/2009 | Johnson et al. | 718/102 |
| 2009/0249094 A1 | 10/2009 | Marshall et al. | |
| 2009/0307708 A1 | 12/2009 | Archer et al. | |
| 2009/0328047 A1 | 12/2009 | Li et al. | |
| 2009/0328055 A1 | 12/2009 | Bose et al. | |
| 2010/0281483 A1 | 11/2010 | Rakib et al. | |
| 2011/0022869 A1* | 1/2011 | Rozen et al. | 713/324 |

OTHER PUBLICATIONS

Lawson, B. and E. Smirni, "Power-aware Resource Allocation in High-end Systems via Online Simulation", © 2005, ACM, Total 10 pp.

Lu, Y., L. Benini, and, G.D. Micheli, "Operating-System Directed Power Reduction", 2000 ACM, Total 6 pp.

Deitel, P.J., H.M. Deitel, J.A. Listfield, T.R. Nieto, C.H. Yaeger, and M. Zlatkina, "Thread Priorities and Thread Scheduling", Feb. 28, 2003, [online], [Retrieved on Mar. 18, 2010]. Retrieved from the Internet at, Total 5 pp.

Pouwelse, J., K. Langendoen, and H. Sips, "Energy Priority Scheduling for Variable Voltage Processors", © 2001 ACM, Total 6 pp.

Quan, G., and X. Hu, "Energy Efficient Fixed-Priority Scheduling for Real-Time Systems on Variable Voltage Processors", © 2001 ACM, Total 6 pp.

Rajagopalan, M., B.T. Lewis, and T.A. Anderson, "Thread Scheduling for Multi-Core Platforms", 2007, Total 6 pp. (Also available at: ).

Singh, K., M. Bhadauria, and S.A. McKee, "Real Time Power Estimation and Thread Scheduling via Performance Counters", ACM SIGARCH Computer Architecture News, vol. 37, No. 2, May 2009, Total 10 pp.

Uhrig, S., "Evaluation of Different Multithreaded and Multicore Processor Configurations for SoPC", 9 Springer-Verlag Berlin Heidelberg 2009, Total 10 pp. (Also available at: ).

U.S. Patent Application, entitled "Scheduling Threads", invented by Elshishiny, H.E. and A.T, Sayed Gamal El Din, Total 32 pp.

Office Action 1 for U.S. Appl. No. 13/247,878, dated Mar. 29, 2013, 28 pp. [57.248 (OA1)].

Response to Office Action 1 for U.S. Appl. No. 13/247,878, dated Jun. 27, 2013, 12 pp. [57.248 (OA1)].

Notice of Allowance 1, dated Oct. 30, 2013, for U.S. Appl. No. 13/247,878, filed on Sep. 28, 2011, 30 pp.

* cited by examiner

SCHEDULING THREADS IN A PROCESSOR BASED ON INSTRUCTION TYPE POWER CONSUMPTION

CROSS-REFERENCE TO RELATED FOREIGN APPLICATION

This application is a non-provisional application that claims priority benefits under Title 35, United States Code, Section 119(a)-(d) or Section 365(b) of European (EP) Patent Application No. 10183345.7, filed on Sep. 30, 2010, by Hisham E. Elshishiny and Ahmed T. Sayed Gamal El Din, which application is incorporated herein by reference in its entirety.

FIELD OF THE INVENTION

The present invention generally relates to processor technology, and more particularly to a method and a system of scheduling threads in a multi-threaded or multi-core processor.

BACKGROUND OF THE INVENTION

In the past years, energy consumption of computers has taken a central role in the design of integrated chips (ICs) and specifically microprocessors. Temperature is directly related to energy dissipated, which in turn is directly proportional to the power consumption within a time interval. Temperature levels mandate cooling rates and packaging technology choices. For example, in recent years companies have been considering fluid cooling subsystems for their high power dissipation machines. Other aspects related to the power dissipation and temperature levels are the reliability of the IC and cost of packaging.

Reliability of the IC is dependent on how much and how often the IC is heated. In an IC production line, the ICs in the testing phase are subject to certain stresses to identify the unreliable ones and exclude them as they are below a pre-defined quality standard. Usually temperature stresses are used to accelerate testing failures. Many failure mechanisms can be accelerated by one of the following methods:

Temperature Acceleration
Voltage and Current Acceleration
Humidity Acceleration

Temperature Acceleration and Voltage and Current Acceleration methods are the most impacting in terms of power dissipation perspective. In particular, the relation of reliability to temperature exhibits an Arrhenius behaviour and Voltage and Current Acceleration is important in relation to maximum power consumption. This is because power identifies the instantaneous voltage current product and high current density is the main factor causing electro-migration in metal lines in the IC which results in IC failure. These failure mechanisms persist in normal operation as well.

The relation between temperature and power dissipation is based on the packaging technology and the cooling system used with that package. If the selected package cannot dissipate the heat generated within the IC at an acceptable rate, a temperature rise is generally observed. Once this rate is surpassed, thermal runaway occurs in the IC and it permanently fails. If reaching that rate value can be avoided, this would increase the reliability of the device and lower the package cost as well. This is particularly of importance for embedded microprocessor applications, where there are space and power constraints which cannot be violated.

Power consumption has leakage, static and dynamic components. The most prevalent one in CMOS technology is dynamic power consumption. There is no static power consumption in traditional CMOS circuits, but leakage is gaining more and more importance as CMOS process technology is further shrunk.

Power consumption and/or dissipation are characterized by two metrics peak and average power. Average power is a metric that affects energy consumption, and is dependent to a great extent on the workload a machine is executing, while peak power has a very important effect on power delivery network design and reliability. If peak power is beyond a certain limit in an integrated chip (IC), the power delivery network will fail and will be permanently damaged, causing IC functional failure.

The circuit or IC in a computer having the most important power consumption is the microprocessor. Microprocessor design and fabrication mainly relies on CMOS technology. Since all applications are transformed into numbers, the microprocessor is always operating and manipulating them. This is the main cause of the high power consumption of the microprocessor. This also causes microprocessors to be the main crunching circuits in the whole machine.

To reduce power consumption and dissipation, two approaches are known: a hardware based approach and a software based approach. Certain software based approaches taken to solve the power consumption and dissipation problem rely on thermal management methods for reducing power consumption at several levels of the software stack.

A thermal management solution to the power consumption problem is provided in US20060107262. US20060107262A1 describes a thread scheduling technique for a multi-core processor relying on the compiler to classify the thread to complex/high power or simple/low power, and then schedule and distribute the threads to run on the different cores based on a criterion defined to reduce the power/thermal density. This solution is provided to reduce power consumption in a unique multi-core processor and is not adapted for multi-threaded processors in which more than one thread runs on each core.

Another approach to the power consumption problem is the one taken in US20030126476. US20030126476 provides a solution for superscalar processors. However, this solution is not adapted to multi-threaded or multi-core processors.

US20050278520 provides another solution based on temperature sensors placed on each processor in a distributed processing system. The information from the temperature sensors are used to schedule tasks of high characteristic values to the lowest temperature processor. Such solution is only adapted for clusters of processors and not adapted for threads.

Another solution described in US20056948082 provides a method that allows a program to make parameter changes to accommodate the temperature profile based on a notification event. However, these parameter changes can affect the hardware configuration (frequency or voltage) resulting in worse performance. Moreover, this solution does not provide the capabilities for maintaining the performance via scheduling and is not adapted to multi threaded or multi core systems.

Still another solution to the power consumption is the one described in US20097596430. According to this solution, a set of temperature indices are requested for each core in a multi-core system. These indices are used to schedule the workload to a processor core instead of another one. This solution uses the mix and match of different work loads to manage temperature and is not adapted to multithreaded systems.

There is accordingly a need for a task scheduling system and method that thermally manages a multithreaded multi-core machine.

SUMMARY OF THE INVENTION

According to the present invention there is provided a method of scheduling jobs according to the appended independent claim 1, and a computer program product and a system according to appended claims 11 and 16 respectively. Preferred embodiments are defined in the appended dependent claims.

With the invention, the heat being generated in one Context Switch (CS) interval can be dissipated in the coming Context Switch while sustaining performance, and increasing the reliability of the Integrated Circuit. This is particularly advantageous in real time embedded systems, where there are deadlines for each job and performance and packaging cost are of utmost importance.

The solution according to the embodiments of the invention is adapted to any number of threads or cores in the processor. It is also adapted for any number of instruction types involved in the instructions that are to be executed.

One advantage of the job scheduling method in accordance with the embodiments of the invention is to guarantee the forward progress of each thread therefore avoiding thread starvation.

The invention is such that it may be easily implemented using Kernel Software capabilities and available hardware resources.

The invention further allows for using the system hardware with lower peak power and lower temperature levels. Accordingly, the reliability of the device due to the reduction of the peak power is increased within the device, and lower packaging costs are needed due to lower cooling requirements.

BRIEF DESCRIPTION OF THE DRAWINGS

Embodiments of the present invention will now be described by way of example with reference to the accompanying drawings in which like references denote similar elements, and in which.

DETAILED DESCRIPTION

Figure 1:
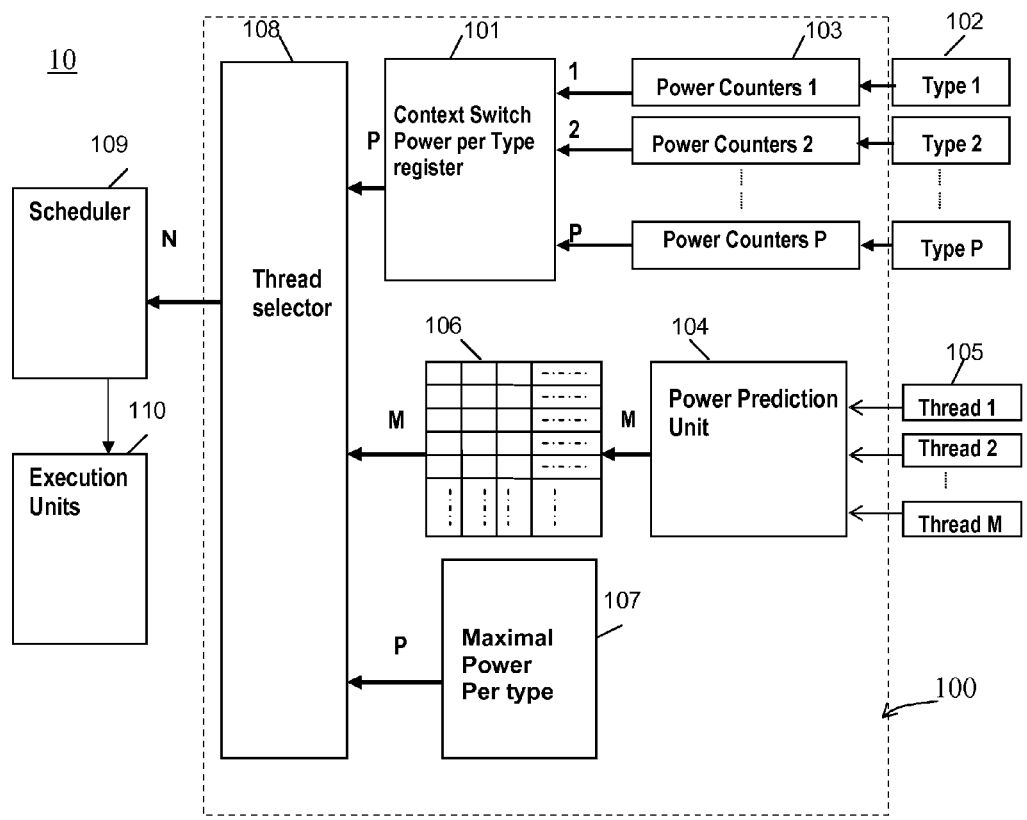
FIG. 1 schematically illustrates a job scheduling system used to schedule jobs/threads in an N-way processor according to certain embodiments of the invention.

According to a preferred embodiment of the invention, a method for guiding OS thread scheduling in multi-core and multi-threaded microprocessors is provided. The method comprises the selection of a subset of the different active threads of applications/jobs running, based on their predicted power consumption relative to the last context switch (CS), to run in the coming context switch time period. As well known in the art, a "Context Switch time period" or "Context Switch interval" represents a period during which a group of applications or threads are scheduled to run on the computer processors for example by the Operating System.

Temporal relative terms, such as "next", "coming", "last", "previous" will be used herein for ease of description to describe a context switch interval in relationship to another context switch interval. It will be understood that these temporal relative terms are intended to encompass consecutive context switch intervals according to a timeline reference. Further, unless otherwise defined, "next" and "coming" on the one hand, or "last" and "previous" on the other hand are used herein in relation with a context switch interval have the same meaning.

The power consuming set of threads that fits the inverse or complement of the previous Context Switch is selected as the ones to schedule and to use in order to populate a scheduling list/table for the next Context Switch. This ensures that the functional units that were used at the last Context Switch will have lower activities and therefore will be able to cool down during the coming Context Switch.

The selected threads are checked to determine if they have a predicted power consumption value below a predefined threshold, otherwise replacement occurs. The selected threads are then scheduled according to the predicted power consumption. The actual power consumed by each running thread is then measured or estimated using any suitable hardware available in the microprocessor. The power consumption history table of the last Context Switch is then updated based on the actual consumed power to make a decision for the coming Context Switch. The same process is repeated every CS period.

To facilitate understanding of certain embodiments of the present invention, there follows definitions of expressions, parameters or notations used in the detailed description:

M: designates the total number of active jobs/threads in the processor; Only a sub-set N of the M jobs/threads could run simultaneously on the processor.

P: designates the number of instruction types that are monitored.

Context Switch (CS): represents the number of clock cycles for context switch interval/Time Quanta.

N: designates the number jobs/threads that could be run in a N-way multi-core/multi-threaded processor, on a N Hardware contexts or logical processors simultaneously; accordingly OS could schedule N jobs/threads on such processor for a given context switch interval/Time Quanta. During a context switch interval, the OS selects N active jobs/threads to schedule them to run on the processor out of the M active jobs/threads. If the number M of active jobs/threads is less than N, OS will schedule all running jobs/threads to run on the processor. If the number M of active jobs/threads is higher than N, the OS will select a sub-set N of jobs/threads to schedule them for running on the processor.

Thread Trace: a thread trace represents a trace that is collected for each thread/job running on the system to identify the sequence of instructions executed for each instruction window and the type for each of these instructions.

Instruction_Power_Estimate_Table: designates the table that maintains the power consumption estimated for each instruction type.

MAX_Power: represents the threshold power value that should not be exceeded for the power level it can be either defined as a total for all instruction types or per instruction type for all running jobs/threads in the context switch interval. This maximum could be predefined during a trace collection process by calculating the maximum power level each job/thread could consume in any particular Context switch interval.

K: is the index representing of the active jobs/threads and ranges from zero to P-1.

J: is the index representing one of the running jobs/threads. J has an index range from zero to N-1.

Power_Type_Th$_k$: parameter accumulating the estimated power consumption for thread/job k for the whole trace of this thread per instruction type.

CS_Power_Type: designates a register per instruction type (P) that records the actual power consumption for each context switch interval per instruction type. This includes all power consumed by all threads.

Instruction_Count_Type: represents a counter that keeps track of instruction type and is used to calculate the average power for the trace for each thread.

ThreadID: represents an identification number for each and every thread.

$\epsilon$: is an acceptable error value that represents the acceptable divergence from exact power value complement. This value can be set for each instruction type or for all types. This value can be initialized to zero, then increased by a step size when needed. The step size itself could be a constant or increase every time it is used.

FIG. 1 shows a hardware configuration of a job scheduling system 100 for scheduling tasks or jobs in a processor 10, in accordance with an embodiment of the invention. System 100 is adapted to run a total number of M active jobs/threads in the system.

The processor 10 is an N-Way multithreaded or multi-core processor comprising N threads out of the M active threads which are selected to run every Context Switch. N accordingly represents the number of jobs/threads among the M active threads that could run simultaneously in the processor 10 on N Hardware contexts or logical processors. The Operating System may schedule N jobs/threads on such processor for a given context switch interval/Time Quanta.

System 100 comprises a context switch power per type data structure 101 such as register (referred to thereinafter as "CS_Power_Type") provided for every Context Switch CS. The CS_Power_Type data structure 101 provides the actual power consumption for each context switch interval per instruction type, for all threads. A context switch (CS) represents the number of clock cycles for context switch interval/Time Quanta. The Context Switch time duration selection is such that it ensures that the functional units being used could cool off during that period, which depends on the packaging technology choice and cooling process. More specifically, the CS_Power_Type data structure 101 (thereinafter referred to as "CS_Power_Type register") holds the measured or estimated power consumption of each instruction type 102 of the N threads that have run in the previous Context Switch. A number P of instruction types are monitored. An instruction type could be a representative of functional units (actual design blocks of the IC) on the Integrated Circuit, for example, integer instructions would be issued to an integer execution unit, floating point instructions would be issued to a floating point execution unit and vector instructions would be issued to a vector execution unit. The power consumed by each instruction type (functional unit) can be measured using hardware sensors or power counters 103.

The job scheduling system 100 further includes a power prediction unit 104 for predicting the power that will be consumed by each thread 1 to N (designated by reference 105). The power prediction unit 104 provides for each thread k among the M active threads P accumulated power consumption estimates, each estimate being determined for one of the P instruction types. The M*P estimates are maintained in a Thread Power Prediction Table 106.

Figure 2:
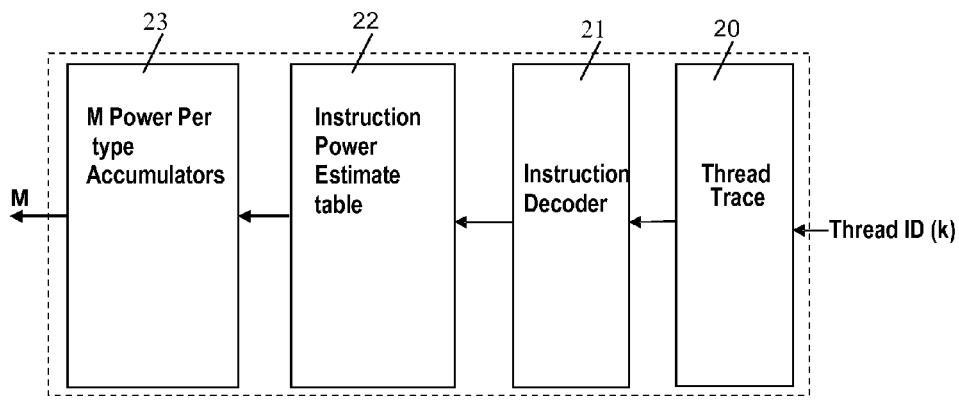
FIG. 2 schematically illustrates the power prediction unit according to certain embodiments.

FIG. 2 shows a block diagram representing a detailed view of the power prediction unit 104 in accordance with certain embodiments of the invention. The power prediction unit 104 comprises a thread trace 20 associating a thread trace with each thread 1 to N. The thread trace 20 keeps track of the expected instructions that the thread is to run. More specifically, the Thread Trace 20 is a data structure maintaining a trace collected for each thread/job running on the system to identify the sequence of instructions executed for each instruction window and the type for each of these instructions. Each thread trace represents a sequence of assembly language instructions used by the thread throughout its lifetime. This sequence is the result of executing the output of the compiler on the microprocessor. For example, running a workload of a database application would be essentially running a set of predefined jobs/threads that represent that workload, containing the assembly instructions that are needed to perform the functions of the software. The assembly language instructions are the ones that the microprocessor supports in its instruction set architecture (ISA). The ISA is divided into different sections depending on the instruction type and/or other criteria; like addressing modes. The thread trace is used by the job scheduling system according to certain embodiments of the invention to identify instructions and their types that are expected to execute within the lifetime of each thread k. Each thread is associated with a thread identifier ThreadID.

For each thread k, the instructions identified from the thread trace 20 are passed to an instruction decoder 21 provided in the processor. The instruction decoder 21 decodes each instruction identified for thread k and identifies its type based on the operation code "opcode" designed in the ISA of that microprocessor. The power prediction unit 104 comprises an Instruction Information data structure 22, such as a lookup table, that maintains an estimate of the power consumption Pi for each type of instructions. The value of power consumption of each instruction can be obtained independently by characterizing the instruction itself in a suitable setup. The table may be a lookup table where the index represents instruction opcode (and possibly more indexes, depending on required complexity/accuracy) and the corresponding power consumption value is read. The following description will be made with reference to an Instruction Information data structure 22 represented by a table, for illustrative purpose only. Once the instructions types are decoded, a power estimate is determined for each decoded instruction by searching the instruction information table 22 (also designated by Instruction_Power_Estimate_Table) based on the instruction type information.

The power estimates determined for all instructions identified in the trace of thread k are then accumulated in a power type accumulator 23 (also referred to as Power_Type_Th$_k$ accumulator). Each Power_Type_Th$_k$ accumulator 23 for a given thread/job k thereby maintains P instruction type power consumptions Power_Type_Th$_{ki}$ estimated for each instruction type i identified in the trace of thread k (P instruction types):

$$\text{Power\_Type\_Th}_k = \{\text{Power\_Type\_Th}_{ki}\} \text{ for } i=1 \text{ to } P$$

In certain embodiments of the invention Power_Type_Th$_{ki}$ is defined by the following equation:

Power_Type_Th$_{ki}$=n$_i$*Pi, where Pi designates the power consumption estimate for instruction type i as obtained from instruction information table 22 and ni designates the number of occurrence of instruction type i among the instructions identified for thread k.

In other embodiments of the invention, one instruction type may comprise different instructions with different power consumption values and all are averaged together so that Power_Type_Th$_{ki}$ is defined as follows:

$$\text{Power\_Type\_Th}_{ki} = \Sigma n_i * Pi / \Sigma ni$$

Each power type accumulator Power_Type_Th$_{ki}$ determined for thread k is accordingly associated with a respective instruction type i. When all the instructions of the current thread trace have been processed, the P values of the Power_Type_T$_{ki}$ accumulators (i=1 to P) are added to the corresponding entries in the Thread Power Prediction table 106 ("Thread_Power_Prediction_Table") and the next thread identified by its identifier ThreadID is processed. The Thread Power Prediction Table 106 comprises an entry per active thread k. Each entry related to a given thread k stores the P accumulated power consumption estimates Power_Type_T$_{ki}$ obtained for each instruction type i.

The Thread Power Prediction Table 106 is used to compare consumption of different N thread combinations with the instruction type power consumption of the previous Context switch (as provided by the context switch power register 101) and determine, based on these comparisons, the best combination of N threads for selection and scheduling during the next Context Switch. The Thread Power Prediction table 106 may be constructed once at the beginning of any job and used throughout the lifetime of the job, using the traces obtained for all the active threads that represent the workload of the machine.

During a context switch interval, the Operating System selects N active jobs/threads to schedule them to run on the processor 10 out of the M active jobs/threads. If the number M of active jobs/threads is less than N, the OS schedules all running jobs/threads to run on the processor 10. If the number M of active jobs/threads is higher than N, the OS selects a sub-set N of jobs/threads to schedule them for running on the processor in accordance with the embodiments of the invention. The possible combinations of N out of M threads are generated dynamically and as they are generated, the first one that fits a selection criterion is preferably chosen. One advantage of choosing the first fit is to save time instead of finding the best fit out of all the $^{M}C_N$ combinations.

Turning back to FIG. 1, system 100 further includes a thread selector 108 to perform the selection of the N threads based on the selection criteria. The thread selection criterion is defined such that an N thread selection allows every functional unit of the microprocessor to cool down after a high activity Context Switch. The thread selection criterion comprises a first condition related to the total expected power consumption of the N threads with respect to the previous Context Switch measured power consumption, and a second condition related to the power consumption per instruction type expected for the N threads with respect to a maximal power threshold 107 (also referred to as MAX_Power) defined for each instruction type.

The first condition in particular comprises determining if the total expected power consumption for the N threads (determined from the power prediction table 106) is substantially equal to the inverse of or complements the power consumption measured for previous Context Switch (determined from CS_Power_Type register 101). It should be understood that the term "complement" as used in the present specification refers to the operation consisting in reversing in a given context switch what happened in the previous Context Switch. More specifically, the complement of the power consumption measured for previous Context Switch is determined as being equal to the maximal power consumption MAX_Power minus the power consumption measured for previous Context Switch. Accordingly, if in the previous Context Switch a given functional unit was intensely used, it will be lightly used or not at all used in the next context switch and instead, other functional units would be used, thereby trying to use the other types of instructions.

The second selection condition comprises determining if the predicted power consumptions per instruction type expected for the N threads are less than the corresponding power thresholds per instruction type i MAX_Power(i) and if so generating and evaluating another combination. MAX_Power(i) thresholds could be predefined during the trace collection process by calculating the maximum power level each job/thread could consume in any particular Context switch interval. This is essentially identified as the maximum power consumed while in the process of collecting the trace.

The threads selected by thread selector 108 are then passed to scheduler 109 for scheduling before execution by execution units 110. The same process is repeated every Context switch.

Figure 3:
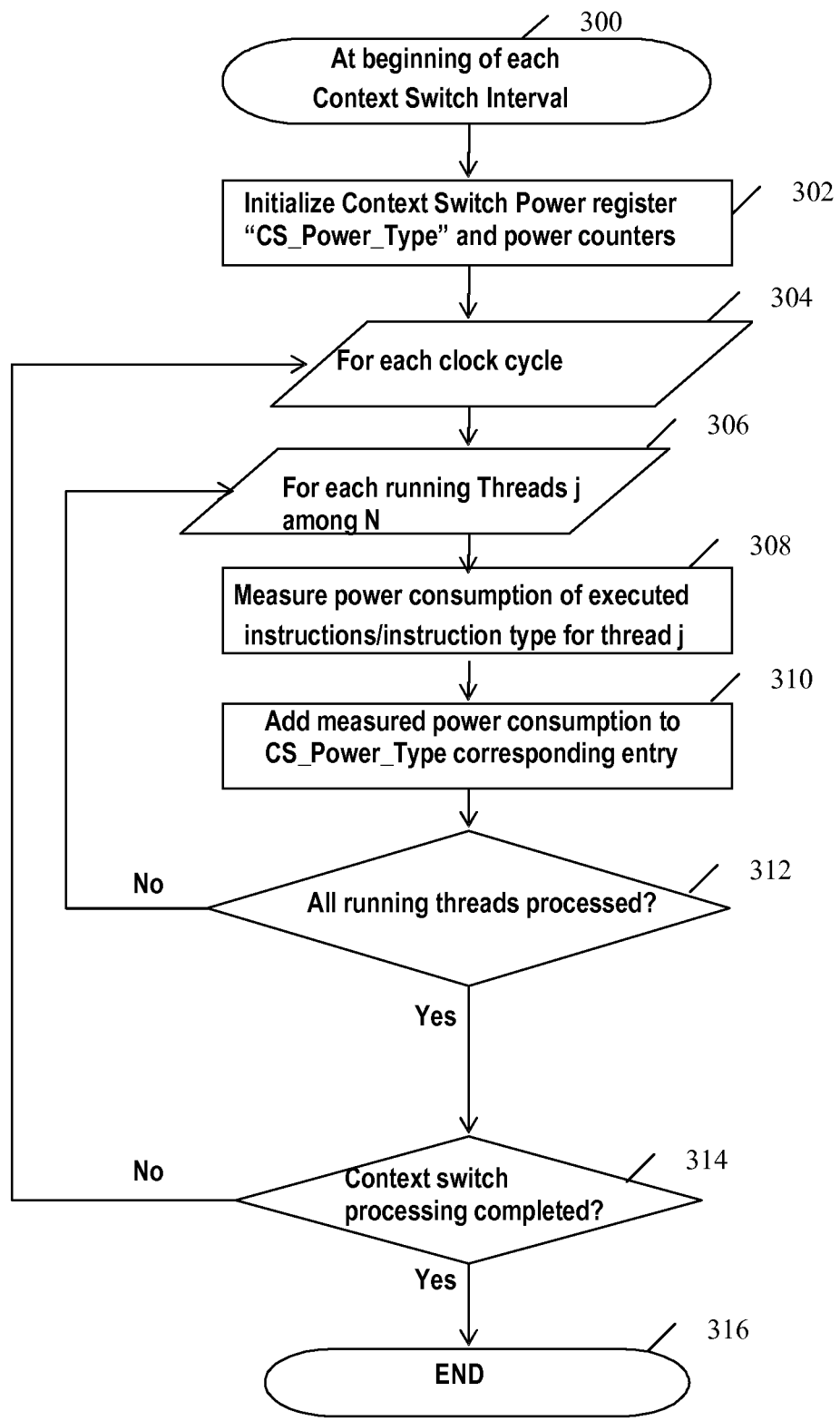
FIG. 3 shows a flowchart for determining the actual consumption per instruction type during the last context switch interval according to certain embodiments.

FIG. 3 shows a flowchart for maintaining the Context Switch power register 101 (CS_Power_Type) providing the actual power consumed by each instruction type during the previous context switch. The process starts at the beginning of each context switch interval (starting step 300) with the initialization of the entries of the CS_Power_Type register in step 302. Alternatively, the update of the Context Switch power register 101 could be started at the beginning of every R Context Switch interval, where R is a predefined number. In one embodiment of the invention, the entries may be set to zero. Step 302 also comprises initializing the P power counters 103, referred to as CS_Power_Th$_i$ so as to measure the power consumed for the instructions executed for each type i, for each clock cycle and for all N threads.

After the initializing step 302, for each clock cycle (step 304), all the running threads are processed. More specifically, for each running thread j (selected in step 306), the power consumption of executed instructions/instruction type is measured in step 308 using the power counters (or registers) 103 that provide the power consumed by instructions within the life cycle of an instruction.

In step 310, the measured values are then written to the CS_Power_Type register 101 in association with the corresponding thread j. The actual power consumption per instruction type maintained in the context switch register 101 will be used for comparison with the coming Context Switch for thread selection. Steps 306 to 310 are repeated for all running threads. When all the running threads have been processed (step 312), it is determined in step 314 if the current context switch is terminated and if not, steps 304 to 312 are repeated for the next clock cycle. Otherwise, the process ends in step 316.

Figure 4:
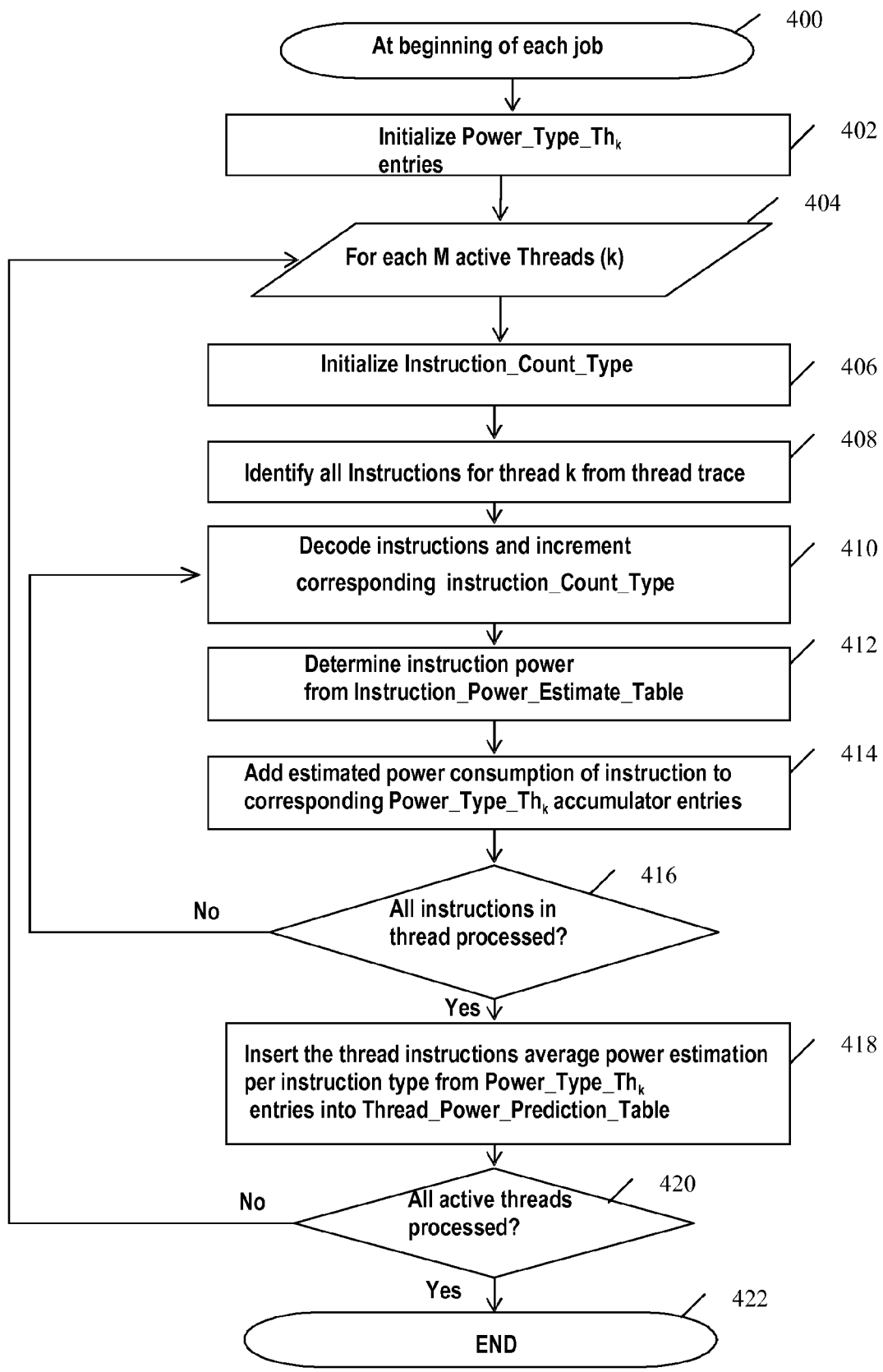
FIG. 4 shows a flowchart for determining the power consumption for the different instruction types expected for each thread according to certain embodiments.

FIG. 4 shows a flowchart illustrating the steps performed by the power prediction unit 104 for estimating the Power Consumptions Per Instruction Type expected for each thread k. These power consumption estimates will be used to predict how much power will be consumed by each thread k, according to certain embodiments of the invention. The power prediction unit 104 estimates the thread power per instruction type by using the thread trace to identify the instructions that are expected to run for each thread, and estimates the power consumption per thread based on the information retrieved from the thread trace.

The process starts in step 400 at the beginning of each job to be scheduled. In step 402, the entries of the power type accumulators Power_Type_Th$_{ki}$ and the entries of the Thread Power Prediction table 105 are initialized (e.g. set to zero). The Thread Power Prediction table 105 comprises an entry per active thread k for storing P estimated power consumptions, each being associated with an instruction type related to an instruction expected for the thread. All the M active threads are then processed as follows: for each active thread k out of the M active threads (selected in step 404), the entries of an instruction type counter Instruction_Count_Type are initialized in step 406. The Instruction Type counter is used to keep track of each instruction type and to calculate the average power for the trace for each thread.

In step 408, the trace of jobs to be run (also referred to as thread trace) is generated, and the trace is then used to identify the instructions and their types that are expected to execute within the lifetime of thread k. Alternatively, for embedded devices, the trace could be generated at another time. The power threshold per type MAX_Power(i) is further estimated for each type of instruction. In step 410, the instructions identified in step 408 are decoded and the instruction type counter Instruction_Count_Type is incremented.

For each identified instruction having a given instruction type, in step 412, the Instruction Information table 22 (Instruction_Power_Estimate) which contains the power estimate of each instruction type is searched to retrieve the instruction power corresponding to this instruction type. In step 414, the estimated power consumption obtained for the instruction type of the identified instruction is added to the current value of the corresponding Power_Type_Th$_{ki}$ accumulator.

Step 416 checks if all the instructions identified for current thread k have been processed. If not, steps 410 to 416 are repeated for the next identified instruction. When all instructions have been processed (condition 416 satisfied). In step 418, the current value of the instruction type counter Instruction_Count_Type is then used to calculate an average value for each Power_Type_Th$_{ki}$.accumulator associated with instruction type. The average value may be computed by dividing the power accumulator for the instruction type by the instruction type Counter. The average power consumption estimates computed for each instruction type associated with an instruction expected for thread k is then stored into the Thread Power Prediction Table 105 in the entry corresponding to thread k. Step 420 is performed to determine if all the M active threads have been processed and if not step 406 to 420 are repeated for the next active thread k. The process terminates at step 422, when all the active threads have been processed. The Thread Power Prediction Table 105 as obtained will be used to determine if different combinations of N threads are eligible to be executed in the coming Context Switch interval.

Figure 5:
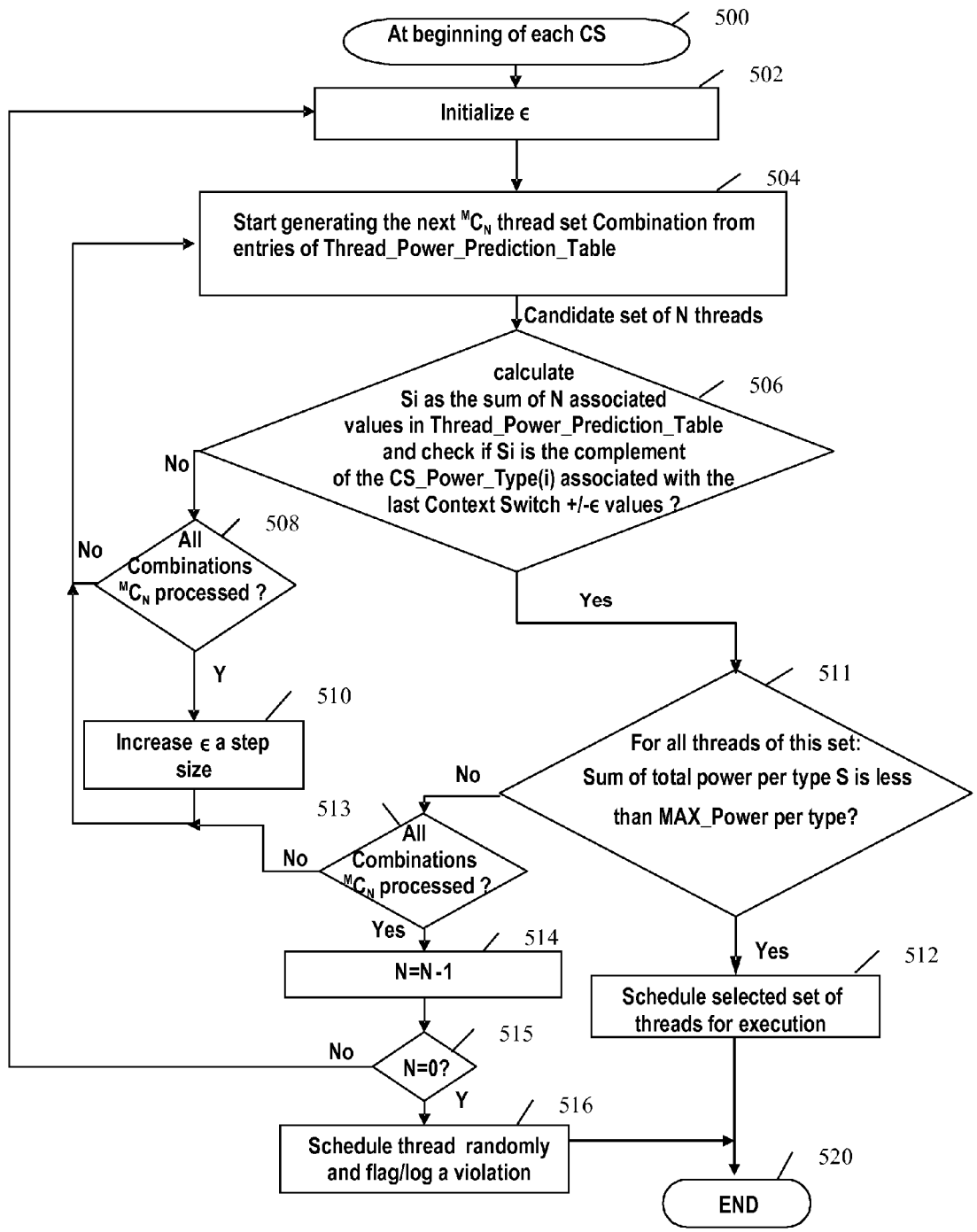
FIG. 5 shows a flowchart for selecting a set of N threads to be scheduled according to certain embodiments of the invention.

FIG. 5 shows a flowchart illustrating the selection of threads to run in the coming context switch according to certain embodiments of the invention. The thread selection is determined from the predicted power consumptions per instruction type (maintained in the thread power prediction table 105) and from the actual power consumptions per instruction type related to the previous context switch (maintained in the Context Switch Power register 101).

To select a set of N out of M active threads, $^{M}C_{N}$ combinations of threads are successively generated at the beginning of each Context Switch (or alternatively at the beginning of every R Context Switch interval, where R is a predefined number) and tested for possible selection and scheduling based on a predefined selection criterion.

The selection process starts in step 500 at the beginning of each context switch.

In step 502, an error parameter $\epsilon$ is initialized. It is set for example to zero. The error parameter $\epsilon$ designates an acceptable error value that represents the acceptable divergence from exact power value complement. This value can be set for each instruction type or for all types. Accordingly, the error parameter can be either dependent on the instruction type level or be associated with a unique value common to all types.

In step 504, a combination $^{M}C_{N}$ is generated thereby providing a candidate set of N threads out of the M active threads, and the total power consumption expected for each instruction type i over the N threads of the candidate set is computed. This is performed by calculating in step 506 for each instruction type i (i=1 to P) the sum Si of the N values Pik (k=1 to N) maintained in the Thread_Power_Prediction_Table 105 for the N thread of the candidate set threads:

Si=Total expected Power consumption per type i for the candidate set of N threads={P$_{i1}$+ . . . +P$_{ik}$+ . . . +P$_{iN}$}, where i=1 to P. Each resulting value Si is then compared to the corresponding value in the Context Switch Power Type register 101 representing the actual power consumptions for instruction type i associated for the previously selected set of N threads during the last context switch interval. More specifically, a first condition is checked to determine if each resulting value Si for the considered candidate set of threads (generated from a $^{M}C_{N}$ combination) is equal to the complement (MAX_Power(i)−CS_Power_Th$_{i}$) of the actual power consumed by instruction type i for the previously selected set of N threads during the last Context Switch (CS_Power_Th$_{i}$), more or less the epsilon value $\epsilon$ (representing the error parameter value which may be defined for the instruction type i or be unique for all instruction types). The first condition will thus be satisfied if:

Si=MAX_Power(i)−CS_Power_Th$_{i}$+/−$\epsilon$, where MAX_Power(i) represents the maximal power threshold.

If the first condition is not satisfied (step 506), and if all the combinations of N threads among the M active threads $^{M}C_{N}$ have not been tested (step 508), the next combination of threads is generated and steps 504 and 506 are iterated for the new candidate set of N threads.

If all combinations of N threads have been tested and if none of the candidate sets of N threads matches the complement of the context Switch power per type (CS_Power_Type) associated with the last Context Switch more or less the $\epsilon$ value, the error parameter $\epsilon$ is increased a step size in step 510, and step 504 and 510 are repeated by regenerating the combinations. The step size itself could be a constant or increased every time it is used.

If the first condition related to the context switch power consumption per instruction type for the last context switch is satisfied (step 506), then in step 511 it may be further determined if the total power Si expected for each instruction type i further satisfies a second condition related to the power threshold MAX_Power(i) predetermined for each type i. The second condition in particular comprises checking if the sum Si for each type i (representing the sum of expected power consumption for each type i over the N threads of the candidate set) does not exceed the power threshold MAX_Power(i) defined for instruction type i. If the second condition is also satisfied, the candidate set of threads is scheduled for execution in step 512. If the second condition is not satisfied, it is determined if all the combination $^{M}C_{N}$ have been tested in step 513 and if not steps 504 and 513 are repeated for the candidate set of threads corresponding to the next combination. However, if all the combination $^{M}C_{N}$ have been tested while providing no set of threads satisfying the first and second conditions, the number N of threads per candidate set is decremented in step 514. In step 515, it is then checked if N=0. If N is determined to have reached a zero value (step 515), a flag is generated to record a violation of the second condition related to the maximal power per type MAX_Power and/or any thread is randomly selected to run alone in step 516. If N has not reached zero, steps 502 to 511 are repeated with the new value of N to generate the $^{M}C_{N}$ combinations again after reinitializing the error parameter $\epsilon$ (epsilon). The selection process is terminated at step 520.

Accordingly, in the preferred embodiment of the invention, the first candidate set of threads that fulfils the following conditions is scheduled:

The candidate set of threads represents the complement of the corresponding values in the context Switch power register 101 or within a range of $\epsilon$ from these values, and satisfies the second condition related to MAX_Power(i) threshold.

If all the combinations are checked and none satisfies the first condition on Context Switch Power Type, the error parameter $\epsilon$ is increased to allow for more variance in the choice of the thread set that matches. If all combinations are checked but none satisfies the condition on MAX_Power thresholds, the number N of threads in the candidate set is decremented before generating new $^{M}C_{N}$ combinations again.

There follows a description of an exemplary application of an embodiment of the invention, for illustrative purpose only. To facilitate understanding of the detailed description of the embodiment of the invention, this example has been highly simplified; however, the skilled person will readily understand that the invention can apply to more complex applications. According to this example, it is assumed that in the last Context Switch, a power consumption X is associated with instructions of type type1, a power consumption Y is associated with instructions of type type2, a power consumption Z is associated with instructions of type type3 and a power consumption L is associated with instructions of type type4. Power consumptions X, Y, Z and L are measured every Context Switch interval and the measures are maintained in the context type power register 101. According to this example, the number of instruction type P is equal to 4 (for type1, type2, type3 and type4), N is initially set to 2 and it is assumed that the number of active threads M is equal to 6. The entries in the Thread Power prediction table 105 are filled from the trace information, for each thread k and for each instruction type i. The table below illustrates the context type power register 101 comprising the actual power consumptions measured for each instruction type during the last Context Switch for the N running threads (previous selection).

| Type 1 | Type 2 | Type 3 | Type 4 |
|---|---|---|---|
| X | Y | Z | L |

The table below illustrates the Power Prediction table 105 (Thread_Power_Prediction_Table) maintained for the M active threads (here 6 active threads) as updated at the beginning of a job, where Pki represents the power consumptions accumulated for each instruction types $Type_i$ related to instructions that are expected to execute within the lifetime of each thread k.

| ThreadID | Type 1 | Type 2 | Type 3 | Type 4 |
|---|---|---|---|---|
| 1 | P11 | P12 | P13 | P14 |
| 2 | P21 | P22 | P23 | P24 |
| 3 | P31 | P32 | P33 | P34 |
| 4 | P41 | P42 | P43 | P44 |
| 5 | P51 | P52 | P53 | P54 |
| 6 | P61 | P62 | P63 | P64 |

To schedule a job, any set of 2 (N) combinations out of the 6 (M) active threads ($^{6}C_{2}$ combinations) is generated as a candidate set of threads, and for each candidate set, the first condition related to the expected power consumption per type i over the 2 threads of the set and the second condition related to the power threshold per type Max_Power(i) are checked. Once the two conditions are met for a given candidate set of two threads, the two threads are selected for scheduling the job.

Considering a combination $^{6}C_{2}$ providing a first thread identified by identifier m and a second thread identified by identifier n with the following values for total power Si per type Type i:

$$S1=Pm1+Pn1 \approx \text{Max\_Power}(1)-X \pm \epsilon 1 \quad S2=Pm2+Pn2 \approx \text{Max\_Power}(2)-Y \pm \epsilon 2$$

$$S3=Pm3+Pn3 \approx \text{Max\_Power}(3)-Z \pm \epsilon 3 \quad S4=Pm4+Pn4 \approx \text{Max\_Power}(4)-L \pm \epsilon 4$$

The sum Si of the power consumption values for each instruction type i during the last context switch is accordingly the complement of the corresponding values X, Y, Z, L (provided in the context Switch Power Type table 101) within a range of $\epsilon$ from these values—and thus the first set (Thread i, Thread j) satisfies the first condition—if in the last Context Switch the power consumption Si of one instruction type (X, Y, Z, or L) was high; in the coming Context Switch, the thread that makes Si low will be then chosen based on the above equations.

The second condition would be satisfied if power consumption Si for type i does not exceed the power threshold Max_Power(i) for type i, which represents the upper ceiling of each and every equation above within an $\epsilon$ acceptable error value. If the Max_Power constraint and $\epsilon$ are global then it will be checked if S1+S2+S3+S4 are within $\epsilon$ from the Max_Power value.

The invention thereby provides an efficient job scheduling method which thermally manages a multithreaded/multi-core processor based on the instruction type. The invention improves IC reliability and increases the Mean Time To Failure (MTTF) of the processor. The thread level thermal aware scheduling method according to the embodiment of the invention is adapted to any number of threads or cores or instruction types.

The invention allows for using the system hardware with lower peak power and lower temperature levels, while guaranteeing the forward progress of each thread and avoiding thread starvation. The reliability of the processor is accordingly increased due to the reduction of the peak power.

While particular embodiments of the present invention have been described herein for purposes of illustration, many modifications and changes will become apparent to those skilled in the art. The invention can take the form of an entirely hardware embodiment, an entirely software embodiment or an embodiment containing both hardware and software elements. In particular it will be appreciated that while elements in FIGS. 1 and 2 are presented in the form of hardware, exactly equivalent effects could be achieved in software. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method for scheduling a number of threads selected from active threads in each context switch interval in a multi-threaded/multi-core processor, comprising:
   for one combination of threads selected from the active threads,
      determining whether a total expected instruction type power consumption for each instruction type during a next context switch interval equals a complement of an actual instruction type power consumption for each instruction type for a given context switch interval, wherein the expected total instruction type power consumption is determined from a sum of expected power consumptions for each instruction type of an instruction scheduled by each of the active threads of the combination, wherein the complement of the actual instruction type power consumption is based on a maximal power consumption minus the actual instruction type power consumption measured for the given context switch;
   in response to determining that the total expected instruction type power consumption for each instruction type during a next context switch interval equals a complement of the actual instruction type power consumption for each instruction type for the given context switch interval, determining whether the total expected power consumption for each instruction type is less than a maximal threshold for that instruction type; and
   in response to determining that the total expected power consumption for each instruction type is less than the maximal threshold for that instruction type, selecting the one combination of threads to be scheduled during the next context switch interval.

2. The method of claim 1, wherein selecting the one combination further comprises:
   pre-selecting the one combination as a candidate set of active threads to be scheduled in response to determining that, for each instruction type, the total expected instruction type power consumption for the one combination during the next context switch interval is equal to the complement of the actual instruction type power consumption determined for the given context switch interval with reference to an error parameter value.

3. The method of claim 2, wherein the error parameter value is defined for each instruction type.

4. The method of claim 1, wherein the maximal threshold is pre-defined for each instruction type.

5. The method of claim 1, wherein, for each of the active threads, determining an expected power consumption for each instruction type further comprises:
   identifying instructions expected to be executed for that active thread; and
   for each of the identified instructions,
      decoding that identified instruction to determine instruction types associated with that identified instruction;
      retrieving a power consumption defined for each of the instruction types from a predefined data structure maintaining information about instruction type consumption; and
      accumulating the power consumption retrieved for each of the instruction types in a power consumption accumulator provided for the instruction type.

6. The method of claim 1, further comprising:
   identifying instructions scheduled for an active thread from a thread trace.

7. The method of claim 6, wherein the thread trace is updated based on one of a job arrival and a termination event.

8. The method of claim 1, wherein the actual instruction type power consumption for the given context switch interval is determined based on measures provided by power counters.

9. A computer program product for scheduling a number of threads selected from active threads in each context switch interval in a multi-threaded/multi-core processor, comprising:
   a non-transitory computer-readable storage medium storing program code, wherein the program code, when executed by a computer, performs:
   for one generated combination of threads selected from the active threads,
      determining whether a total expected instruction type power consumption for each instruction type during a next context switch interval equals a complement of an actual instruction type power consumption for each instruction type for a given context switch interval, wherein the expected total instruction type power consumption is determined from a sum of expected power consumptions for each instruction type of an instruction scheduled by each of the active threads of the combination, wherein the complement of the actual instruction type power consumption is based on a maximal power consumption minus the actual instruction type power consumption measured for the given context switch;

in response to determining that the total expected instruction type power consumption for each instruction type during a next context switch interval equals a complement of the actual instruction type power consumption for each instruction type for the given context switch interval, determining whether the total expected power consumption for each instruction type is less than a maximal threshold for that instruction type; and in response to determining that the total expected power consumption for each instruction type is less than the maximal threshold for that instruction type, selecting the one generated combination of threads to be scheduled during the next context switch interval.

10. The computer program product of claim 9, wherein, for selecting the one combination, the program code, when executed by the computer, performs:

pre-selecting the one combination as a candidate set of active threads to be scheduled in response to determining that, for each instruction type, the total expected instruction type power consumption for the one combination during the next context switch interval is equal to the complement of the actual instruction type power consumption determined for the given context switch interval with reference to an error parameter value.

11. The computer program product of claim 9, wherein, for each of the active threads, for determining an expected power consumption for each instruction type, the program code, when executed by the computer, performs:

identifying instructions expected to be executed for that active thread; and for each of the identified instructions,
decoding that identified instruction to determine instruction types associated with that identified instruction;
retrieving a power consumption defined for each of the instruction types from a predefined data structure maintaining information about instruction type consumption; and
accumulating the power consumption retrieved for each of the instruction types in a power consumption accumulator provided for the instruction type.

12. The computer program product of claim 9, wherein the program code, when executed by the computer, performs:

identifying instructions scheduled for an active thread from a thread trace.

13. The computer program product of claim 9, wherein the thread trace is updated based on one of a job arrival and a termination event.

14. The computer program product of claim 9, wherein the actual instruction type power consumption for the given context switch interval is determined based on measures provided by power counters.

15. A system for scheduling a number of threads selected from active threads in each context switch interval in a multi-threaded/multi-core processor, comprising:

a multi-threaded/multi-core processor having a given instruction window; and a storage device connected to the multi-threaded/multi-core processor, wherein the storage device has stored thereon program code, and, wherein the multi-threaded/multi-core processor is configured to execute the program code to perform operations, wherein the operations comprise:

for one generated combination of threads selected from the active threads,
determining whether a total expected instruction type power consumption for each instruction type during a next context switch interval equals a complement of an actual instruction type power consumption for each instruction type for a given context switch interval, wherein the expected total instruction type power consumption is determined from a sum of expected power consumptions for each instruction type of an instruction scheduled by each of the active threads of the combination, wherein the complement of the actual instruction type power consumption is based on a maximal power consumption minus the actual instruction type power consumption measured for the given context switch;

in response to determining that the total expected instruction type power consumption for each instruction type during a next context switch interval equals a complement of the actual instruction type power consumption for each instruction type for the given context switch interval, determining whether the total expected power consumption for each instruction type is less than a maximal threshold for that instruction type; and in response to determining that the total expected power consumption for each instruction type is less than the maximal threshold for that instruction type, selecting the one combination of threads to be scheduled during the next context switch interval.

16. The system of claim 15, wherein the operations for selecting the one combination further comprise:

pre-selecting the one combination as a candidate set of active threads to be scheduled in response to determining that, for each instruction type, the total expected instruction type power consumption for the one combination during the next context switch interval is equal to the complement of the actual instruction type power consumption determined for the given context switch interval with reference to an error parameter value.

17. The system of claim 15, wherein, for each of the active threads, the operations for determining an expected power consumption for each instruction type further comprise:

identifying instructions expected to be executed for that active thread; and for each of the identified instructions,
decoding that identified instruction to determine instruction types associated with that identified instruction;
retrieving a power consumption defined for each of the instruction types from a predefined data structure maintaining information about instruction type consumption; and
accumulating the power consumption retrieved for each of the instruction types in a power consumption accumulator provided for the instruction type.

18. The system of claim 15, wherein the operations further comprise:

identifying instructions scheduled for an active thread from a thread trace.

19. The system of claim 15, wherein the thread trace is updated based on one of a job arrival and a termination event.

20. The system of claim 15, wherein the actual instruction type power consumption for the given context switch interval is determined based on measures provided by power counters.

* * * * *